(No Model.)
J. PAOLI.
LEVELING INSTRUMENT.
No. 434,399. Patented Aug. 12, 1890.
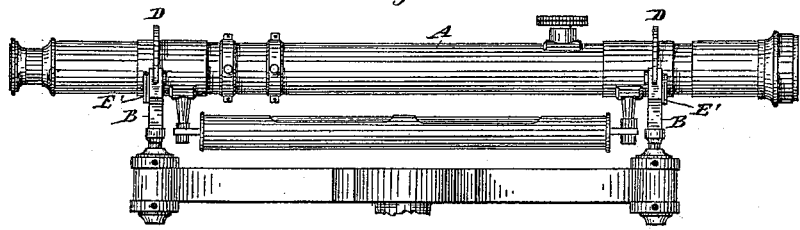
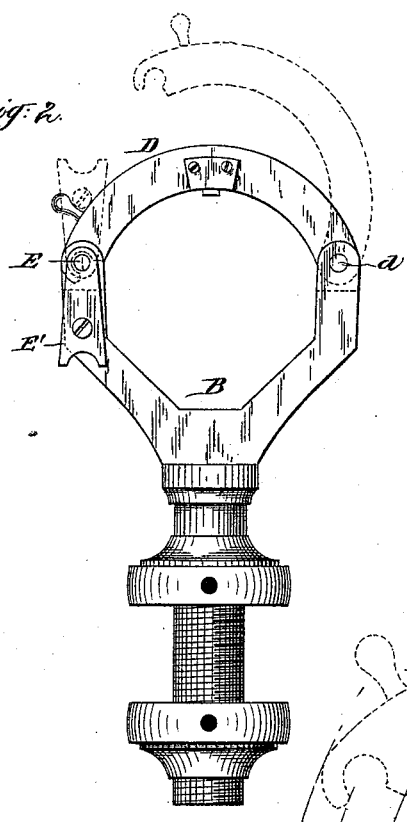
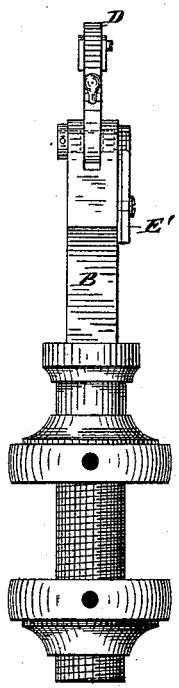
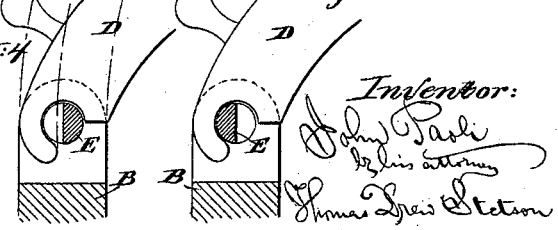

UNITED STATES PATENT OFFICE.

JOHN PAOLI, OF HOBOKEN, NEW JERSEY, ASSIGNOR TO WILLIAM KEUFFEL AND HERMANN ESSER, BOTH OF SAME PLACE.

LEVELING-INSTRUMENT.

SPECIFICATION forming part of Letters Patent No. 434,399, dated August 12, 1890.

Application filed April 8, 1890. Serial No. 347,098. (No model.)

*To all whom it may concern:*

Be it known that I, JOHN PAOLI, a citizen of the United States, residing at Hoboken, in the county of Hudson and State of New Jersey, have invented a certain new and useful Improvement in Surveyors' Instruments, of which the following is a specification.

I have in my experiments applied the invention to the instrument known as an "engineer's level," and will describe it as thus applied.

The improvement relates to the provisions for holding the telescope with delicacy and firmness in the Y-shaped bearings and for conveniently engaging and disengaging the fastenings at will. The importance of these bearings is very generally appreciated, and devices have long been used to allow the telescope to be lifted out and reversed in position to sight backward, as well as forward, from the instrument without changing the position of the other parts; but all these known to me are open to objection. I attain the end by employing at each of the two bearings a rigid curved lever or clip hinged to one side and hook-shaped at its other end, which engages the hook by the partial revolution of the cam.

The accompanying drawings form a part of this specification, and represent what I consider the best means of carrying out the invention.

Figure 1 is a side elevation showing the fastenings engaged. The remaining figures show parts detached. Fig. 2 is an end elevation, the strong lines showing the parts in the same condition as in Fig. 1, and the dotted lines show the clip liberated and partly raised to allow the telescope to be lifted out and reversed. Fig. 3 is a corresponding elevation at right angles to Fig. 2. Figs. 4 and 5 show certain portions on a still larger scale. Each is a vertical section showing the means for fastening the free end of the clip. Fig. 4 shows the cam in the position to allow the clip to be raised and lowered freely. Fig. 5 shows the condition when the cam has been partially rotated to confine the clip.

Similar letters of reference indicate corresponding parts in all the figures where they occur.

A is the telescope.

B are Y-shaped bearings, each of which, it will be understood, is supported in the ordinary manner, being firmly connected and equipped with devices for leveling and for conveniently mounting on a tripod or other suitable support.

D is a confining lever or clip hinged to the Y-support at the point $d$ and bifurcated at the opposite end, the outer branch being longer than the inner and hook-shaped, as shown. When the telescope is in place and the clip D is depressed by the attendant, its free end enters slots in the opposite branch of the Y-support. In this branch is mounted a shaft E, which is provided with complete cylindrical bearings, but has one-half cut away in the intermediate portion, where the clip D is received and engaged. One end of the shaft E has a rigid arm E', the end of which is forked to promote its easy engagement with the finger of the operator.

To liberate the clip D, the cam E is turned by bringing its arm E' into an upright position. This throws the full side of the cam into such position that the clip may be easily lifted. This is the position of the parts shown in Fig. 4. When the telescope has been reversed and it is desired to again strongly and delicately reconfine it, the clip D is brought down, with the shaft E remaining in the same position as before. After the clip D is fully depressed the cam E is turned a half-revolution by acting on its arm E', and now the clip is strongly confined. This is the position of the parts indicated in Fig. 5.

The inner surface of each clip D should be finished very accurately. It may be equipped with the ordinary exchangeable bearing-piece. I have shown it as thus provided.

Modifications may be made without departing from the principle or sacrificing the advantages of the invention. The end of the rigid lever D need not be bifurcated. The inner prong performs no essential function. The outer prong, with its hook form adapted to be engaged strongly by a partial revolution of the cam without inducing any undue pressure on the clip, may serve without its associate prong.

I claim as my invention—

As an improvement in surveyors' instruments, the Y-shaped bearing B, telescope A, rigid clip D, hinged at $d$ and hook-shaped at the opposite end, cam E, and provisions, as the arm E', for partially rotating the latter, all combined and arranged for joint operation as herein specified.

In testimony whereof I have hereunto set my hand, at New York city, this 1st day of April, 1890, in the presence of two subscribing witnesses.

JOHN PAOLI.

Witnesses:
CHARLES R. SEARLE,
CHAS. S. BARBER.